US012732461B2

(12) United States Patent
Anderberg et al.

(10) Patent No.: US 12,732,461 B2
(45) Date of Patent: Sep. 8, 2026

(54) METHOD FOR TRANSMITTING DATA VIA A SERIAL, ASYNCHRONOUS INTERFACE, METHOD FOR RECEIVING DATA VIA A SERIAL, ASYNCHRONOUS INTERFACE, DEVICE AND SYSTEM

(71) Applicant: u-blox AG, Thalwil (CH)

(72) Inventors: Andreas Anderberg, Malmö (SE); Henning Rehn, Malmö (SE)

(73) Assignee: u-blox AG, Thalwil (CH)

( * ) Notice: Subject to any disclaimer, the term of this patent is extended or adjusted under 35 U.S.C. 154(b) by 0 days.

(21) Appl. No.: 18/751,523

(22) Filed: Jun. 24, 2024

(65) Prior Publication Data

US 2025/0016096 A1 Jan. 9, 2025

(30) Foreign Application Priority Data

Jul. 5, 2023 (EP) .................................... 23183595

(51) Int. Cl.
*H04L 47/10* (2022.01)

(52) U.S. Cl.
CPC .................................... *H04L 47/10* (2013.01)

(58) Field of Classification Search
CPC ............... G06F 11/3495; G06F 13/385; G06F 13/4286; G06F 16/27; G06F 9/54; G06F 9/545; H04L 47/10; H04L 51/18; H04L 67/12; H04L 69/08; H04L 69/18; H04L 69/22; H04L 69/26; H04L 69/329
See application file for complete search history.

(56) References Cited

U.S. PATENT DOCUMENTS 4,574,362 A * 3/1986 Spindel ............... G06F 13/4221 341/94
4,805,194 A * 2/1989 Wesolowski ........... H04L 67/12 370/522
2015/0032909 A1* 1/2015 Remple ................ G06F 13/385 710/14

(Continued)

FOREIGN PATENT DOCUMENTS

CN 112738755 4/2021

OTHER PUBLICATIONS

[No Author Listed], 3rd Generation Partnership Project; Technical Specification Group Terminals; Technical realization of the Short Message Service (SMS) (Release 4), 3GPP TS 23.040 V4.6.0, Mar. 2002, 128 pages.

(Continued)

*Primary Examiner* — Christopher Biagini
(74) *Attorney, Agent, or Firm* — Fish & Richardson P.C.

(57) ABSTRACT

In one embodiment a method for transmitting data via a serial, asynchronous interface comprises the steps of operating (S10) a device in a text-based receiving protocol mode, receiving (S12), by the device while operating in the text-based receiving protocol mode, via the interface, a request message (Rq) comprising a binary header component and a length indication, entering (S13), by the device, into a binary receiving protocol mode upon receipt of the request message, receiving (S14), by the device while operating in the binary receiving protocol mode, an amount of binary data (D), the amount being specified by the length indication of the request message, exiting (S15), by the device, the binary receiving protocol mode.

18 Claims, 4 Drawing Sheets

(56) References Cited

U.S. PATENT DOCUMENTS

2016/0352795 A1* 12/2016 Badulescu ............ H04L 65/762

OTHER PUBLICATIONS

[No Author Listed], Digital cellular telecommunications system (Phase 2+); Universal Mobile Telecommunications System (UMTS); Use of Data Terminal Equipment—Data Circuit terminating Equipment (DTE-DCE) interface for Short Message Service (SMS) and Cell Broadcast Service (CBS), 3GPP TS 27.005 version 5.0.0 Release 5, ETSI TS 127 005 V5.0.0, Jun. 2002, 70 pages.

Extended European Search Report in European Appln. No. 23183595.0, mailed on Dec. 20, 2023, 8 pages.

* cited by examiner

METHOD FOR TRANSMITTING DATA VIA A SERIAL, ASYNCHRONOUS INTERFACE, METHOD FOR RECEIVING DATA VIA A SERIAL, ASYNCHRONOUS INTERFACE, DEVICE AND SYSTEM

CROSS-REFERENCE TO RELATED APPLICATION(S)

This application claims priority to European Application No. 23183595.0 filed on Jul. 5, 2023, the contents of which are incorporated herein by reference in their entirety.

TECHNICAL FIELD

The present disclosure relates to the field of communication, especially to exchange of data, i.e., sending and receiving data via an interface. Specifically, the disclosure is directed to a method for transmitting data via a serial, asynchronous interface, a method for receiving data via a serial, asynchronous interface, a device and a system.

BACKGROUND

In the field of exchange of data between different devices communication protocols are used for enabling involved devices to communicate with each other. Usually, interfaces are defined which provide access to such protocols, thereby freeing involved devices from the burden of knowing all of the specifics defined in the protocol. A well-known example of such an interface is the so-called socket interface, which provides access to a Transmission Control Protocol, TCP, Internet Protocol, IP, User Datagram Protocol, UDP, protocol implementation, also referred to as a TCP/IP or UDP/IP protocol stack. An interface is employed within a device for exchanging data between different modules or entities, like protocol stacks or radio frequency transmitter-receiver modules.

An interface may be realized as a serial or a parallel interface and may be operated synchronously or asynchronously. This description focusses on interfaces which exchange data in a serial, asynchronous way, i.e., without using a clock signal that is shared between a participating sender and receiver.

Furthermore, an interface may be implemented as a text-based interface, which is controlled by readable text or strings. Another type of interface is realized as a binary interface, accepting and providing binary data. This description is directed to text-based types of interfaces.

A well-known and widely implemented text-based, asynchronous, serial interface is the AT command set, sometimes also referred to as the Hayes AT command set. This AT command set is renowned as a de-facto standard in communications. The AT command set used nowadays originates from the Hayes AT command set or modem attention command set, which had been developed by Hayes for telephone modems. State of the art implementations of the AT command set interface are also used for providing access to TCP/UDP/IP sockets.

Unfortunately, known asynchronous, serial interfaces often suffer from low throughput resulting from wait states caused by inevitable synchronization between sending and receiving parties, for example a host and a module, in the course of data exchange. In detail, a host, e.g., an entity using communication functionality, and a module, e.g., an entity providing said communication functionality, should be synchronized before transmitting data. For this, receipt of commands and/or data is actively confirmed. In detail, it may be necessary to indicate to the host or module when data have been received and further data can be transmitted by the module or host. If either host or module runs out of memory, the transmission has to be interrupted. An established solution to these problems is, for example, the use of flow-control mechanisms. Specifically, a host may issue a command asking the module how much data a module can accept, which, however, introduces more wait states. Or a host may send data without knowing the amount of data a module can accept, which may lead to a complete pause of the whole communication channel if the module runs out of memory, or in the worst case may lead to loss of data and imply a retransmission. In any case, the resulting throughput across the interface is unsatisfactorily low, especially when compared to data rates and corresponding throughput realized by communication technologies like Wi-Fi or Ethernet, which may be controlled via such an interface. The interface may even end up as the bottleneck in this type of communication.

An objective may therefore be seen in providing methods, a device and a system which overcome the shortcomings of the state of the art. In particular, a solution shall be provided which improves the throughput over a serial, asynchronous interface.

This objective is achieved by the subject-matter of the independent claims. Embodiments and developments are defined in the dependent claims.

The definitions provided above also apply to the following description unless stated otherwise.

SUMMARY

In one embodiment a method for transmitting data via a serial, asynchronous interface, comprises the following steps:

operating a device in a text-based receiving protocol mode, receiving, by the device while operating in the text-based receiving protocol mode, via the interface, a request message comprising a binary header component and a length indication, entering, by the device, into a binary receiving protocol mode upon receipt of the request message, receiving, by the device while operating in the binary receiving protocol mode, an amount of binary data, the amount being specified by the length indication of the request message, exiting, by the device, the binary receiving protocol mode.

As soon as the device receives the request message with the binary header component and the length indication, it enters into the binary receiving protocol mode. This request message, especially the header component, indicates that the next sequence of bytes will be in binary mode. From the length indication, the module determines when to exit the binary mode. Due to the use of this simple binary header in the request message, wait states resulting from the binary synchronization, which are inevitable in state-of-the-art implementations, are removed. Consequently, the throughput across the serial, asynchronous interface is improved.

In other words, according to the specified method, the module follows the simple rule that whenever the binary header is received together with the length indication in the request message, it starts operating in the binary receiving protocol mode, in which it remains until the number of bytes indicated in the length indication has been received. Thus, the device and its counterpart, which sends the information, are always in sync without any wait states dedicated to the synchronization of the communication partners.

After exiting the binary receiving protocol mode the device again operates in the text-based receiving protocol mode.

In a development operating the device in the text-based receiving protocol mode comprises initializing the operation in the binary receiving protocol mode.

The text-based receiving protocol mode is characterized by receiving text messages or data, i.e., strings, from the counterpart communicating with the module, for instance a host. The strings may be formatted in American Standard Code for Information Interchange, ASCII. The changeover between the operation in the text-based receiving protocol mode to the operation in the binary receiving protocol mode is affected directly after receiving the request message.

In a development, initializing the operation in the binary receiving protocol mode comprises receiving, by the device, at least one command message comprising a header and a command component. The command message complies with the AT command set.

The command message is a text message, which is received in the text-based receiving protocol mode. The command component of this message announces the subsequent arrival of the request message. The subsequent receipt of the request message results, as described, in the automatic switch to the binary receiving protocol mode and immediate transfer of binary data in this mode.

In a development, the method further comprises the steps of sending, by the device, while receiving the amount of binary data, a notification message comprising a notification component defining a maximum amount of data, which the device is able to receive, and receiving, by the device, another amount of binary data while operating in the binary receiving protocol mode. This other amount of binary data is specified by the notification component of the notification message.

The device is operating in full duplex, in that it may concurrently receive and send data over the serial, asynchronous interface. For reasons of flow control, while operating in the binary receiving protocol mode and receiving binary data according to the request message, the device may send the notification message via the interface to its counterpart, for instance a host. The notification message is a text message. The notification message enables direct continuation of the receipt of more binary data in the binary receiving protocol mode. Wait states, which are needed in state-of-the-art implementations for resynchronization for receiving a new chunk of binary data, are avoided. This further increases the throughput via the serial, asynchronous interface.

The binary mode is used separately for each direction. Here the receiving direction operates in binary mode, while the sending direction remains in the text-based mode unless the sending side also receives a request message. By letting each direction be controlled independently the interface can be utilized more efficiently. This also allows sending the notification message in the text-based mode, which message informs about how much more data can be sent in the next chunk, while it is still transmitting the present chunk.

In a refinement, the notification message additionally comprises a confirmation information, which confirms successful receipt of the command message and the request message.

The notification message does not confirm successful receipt of the binary data. Rather, it contains information about how much data the device can receive, to let its counterpart know during the exchange of the current amount of binary data, if more data can be queued up and sent directly after the current amount of binary data.

In a development, directly after the device receives the other amount of binary data while operating in the binary receiving protocol mode, the method further comprises the steps of entering, by the device, into the text-based receiving protocol mode, and receiving, by the device while operating in the text-based receiving protocol mode, another command message comprising a header component and a command component.

Said other command message also complies with the AT command set. In particular, the header component is represented by AT and the command component is represented by SEND. In the case that the maximum amount of data which has been indicated with the notification message has not been fully used up after receiving the other amount of binary data, the other command message is directly transferred to and received by the module. This eliminates further wait states which are needed in state-of-the-art implementations for resynchronizing host and device. The throughput via the serial, asynchronous interface is further optimized. In one embodiment a method for receiving data via a serial, asynchronous interface comprises the following steps: operating a device in a text-based sending protocol mode, sending, by the device, while operating in the text-based sending protocol mode, via the interface, a request message comprising a binary header component and a length indication, entering, by the device, into a binary sending protocol mode, sending, by the device while operating in the binary sending protocol mode, an amount of binary data, the amount being specified by the length indication of the request message, exiting, by the device, the binary sending protocol mode.

By means of the request message, a synchronized switchover between the text-based sending protocol mode and the binary sending protocol mode is achieved. In this case, the module is sending binary data and announces this sending with the request message. The amount of binary data is sent directly after sending the request message, thereby reducing wait states, which otherwise would be needed for synchronizing sender and receiver, or module and host as in this embodiment. Thereby, throughput is enhanced when compared with state-of-the-art implementations of a text-based protocol exchanging data via a serial, asynchronous interface.

After exiting the binary sending protocol mode the device again operates in the text-based sending protocol mode.

In a refinement, operating the device in the text-based sending protocol mode comprises initializing operation in the binary sending protocol mode.

In the text-based sending protocol mode the switchover to the operation in the binary sending protocol mode is already initiated.

In a development, initializing operation in the binary sending protocol mode comprises the following steps: receiving, by the device, at least one command message comprising a header component, a command component and a first length indication, wherein the command message complies with the AT command set, and the command component triggers the subsequent sending of the request message, and sending, by the device, a confirmation message confirming receipt of the command message and comprising a second length indication.

In this development, the initialization of the switchover from the text-based to the binary sending protocol mode is triggered by the device's counterpart, such that the device receives the command message. Said command message represents said counterpart's willingness to read data from the serial, asynchronous interface. The first length indication denotes the amount of data that said counterpart would like to receive. Thereupon, the device sends the confirmation message and by means of the second length indication, informs how much data is available. Therein, first and second length indications may have different values. The command message and the confirmation message are both text messages.

In a refinement, the method further comprises, while sending the amount of binary data by the device, the steps of receiving, by the device, another command message comprising a header component, a command component and another length indication, continuing with sending, by the device in the binary sending protocol mode, binary data according to the other length indication of the other command message.

As the serial, asynchronous interface is a full duplex interface, the device is able to concurrently send and receive messages and data across this interface. Particularly, as described, while sending binary data in the binary sending protocol mode, the device receives another command message, informing about the counterpart's willingness to receive more binary data, the amount of which is indicated in the other length indication. Consequently, the device is enabled to directly continue sending more binary data without any need for resynchronization, which leads to further improvement of the throughput.

In an alternative development initializing operation in the binary sending protocol mode comprises:

sending, by the device, a trigger message comprising an indication of an amount of available binary data.

In this alternative, the switchover from text-based to binary sending protocol mode is initiated by the device by sending the trigger message. This trigger message may be sent spontaneously at any time, for instance as soon as the device receives data, for example from a TCP/IP protocol stack. The sending of the trigger message, which is a text message, is followed directly by sending the request message and the switchover to the binary sending protocol mode. Data can be sent without any wait states, thereby optimizing the throughput via the serial, asynchronous interface.

In a development, the binary header component of the request message comprises a predefined character.

Said predefined character is unique and is the same for every request message used in the different embodiments of the methods described herein. The character that is used for the header component of the request message is defined beforehand, such that the device and its counterpart are able to clearly identify the request message.

In one embodiment a device comprises means configured to perform the method for transmitting data via a serial, asynchronous interface, and/or means configured to perform the method for receiving data via the serial, asynchronous interface as defined above, and the serial, asynchronous interface.

By implementing one or both of the methods described above, the device achieves a higher throughput via the serial, asynchronous interface, when compared with state-of-the-art implementations, by eliminating wait states.

In a development, the device is implemented as an integrated module further comprising hardware and software components for realizing a communication functionality. The communication functionality is configured for control via the serial, asynchronous interface.

The communication functionality comprises wireline and wireless communication functionality, for instance according to one or more of wireless LAN, WLAN, Bluetooth, BT, Bluetooth Low Energy, BLE, ultra-wideband, UWB, Ethernet according to IEEE 802.11x, third generation partnership program, 3GPP, compliant mobile communication, each of which is implemented as known to the skilled person. The serial, asynchronous interface may be implemented as a universal asynchronous receive and transmit, UART, interface. The interface is used to control the communication functionality without having to know all the specifics of each and every functionality.

In one embodiment a system comprises a device as described above and a host apparatus comprising a serial, asynchronous interface, which is coupled to the serial, asynchronous interface of the device. The host apparatus is configured for communication using the device via the serial, asynchronous interface.

The system may be implemented, for example, on a microcontroller. The host apparatus and the device communicate and exchange data using the serial, asynchronous interface. In this communication, the methods described above are employed for optimizing the throughput via the interface.

BRIEF DESCRIPTION OF THE DRAWINGS

The text below explains the proposed solution in detail using exemplary embodiments with reference to the drawings. Components and elements that are functionally identical or have an identical effect bear identical reference numbers. Insofar as parts or components correspond to one another in their function, a description of them will not be repeated in each of the following figures. Therein.

DETAILED DESCRIPTION

Figure 1:
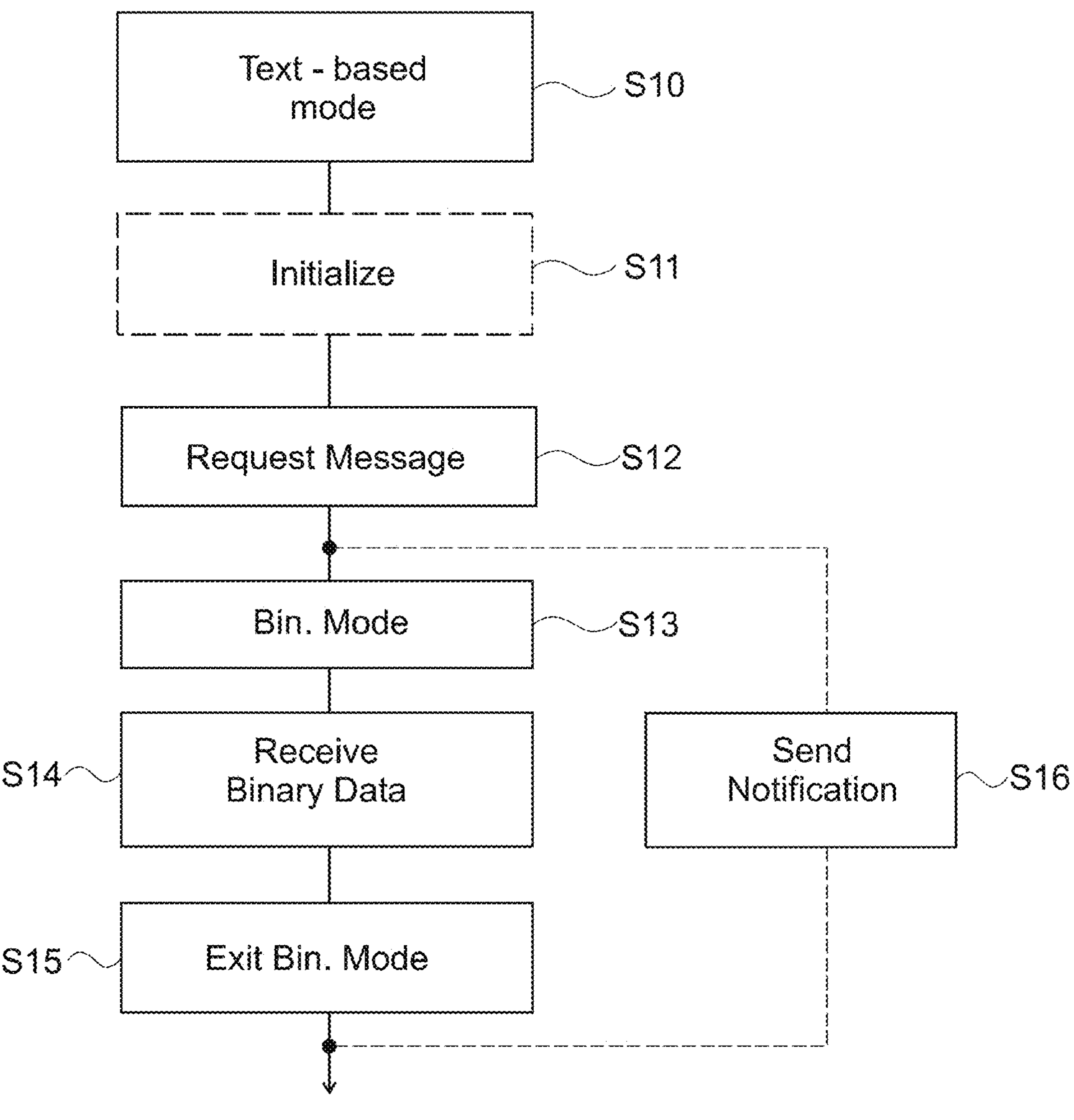
FIG. 1 shows an embodiment example of a method for transmitting data via a serial, asynchronous interface as proposed.

FIG. 1 shows an exemplary embodiment of a method for transmitting data via a serial, asynchronous interface as proposed. The method comprises the following steps:

S10: operating a device in a text-based receiving protocol mode,

S12: receiving, by the device while operating in the text-based receiving protocol mode, via the interface, a request message comprising a binary header component and a length indication,

S13: entering, by the device, into a binary receiving protocol mode upon receipt of the request message,

S14: receiving, by the device, while operating in the binary receiving protocol mode, an amount of binary data, and S15: exiting, by the device, the binary receiving protocol mode.

The device receives data sent or transmitted from a counterpart. The device switches between the text-based and the binary receiving protocol mode. As soon as the device has received the request message in step S12, it enters into the binary mode in step S13 and in step S14 directly starts receiving the amount of binary data, which has been indicated by a length indication of the request message. Due to the synchronizing of the device with a sending counterpart by means of the request message in step S12, wait states, which are necessary in state-of-the-art implementations of text-based serial, asynchronous interfaces, are reduced. This leads to enhanced throughput.

Optionally, the method also comprises a step S11: Initializing, by the device, operation in the binary receiving protocol mode.

Optionally, the method may further comprise step S16: Sending, by the device, while receiving the amount of binary data, a notification message comprising a notification component defining a maximum amount of data which the device is able to receive.

The notification message is sent as a text message using the full duplex functionality of the serial, asynchronous interface. The notification message may additionally comprise a confirmation information, which confirms successful receipt of the command message of step S11 and the request message of step S12. Step S16 is performed concurrently to steps S13, S14 and S15 as indicated in FIG. 1.

Figure 2:
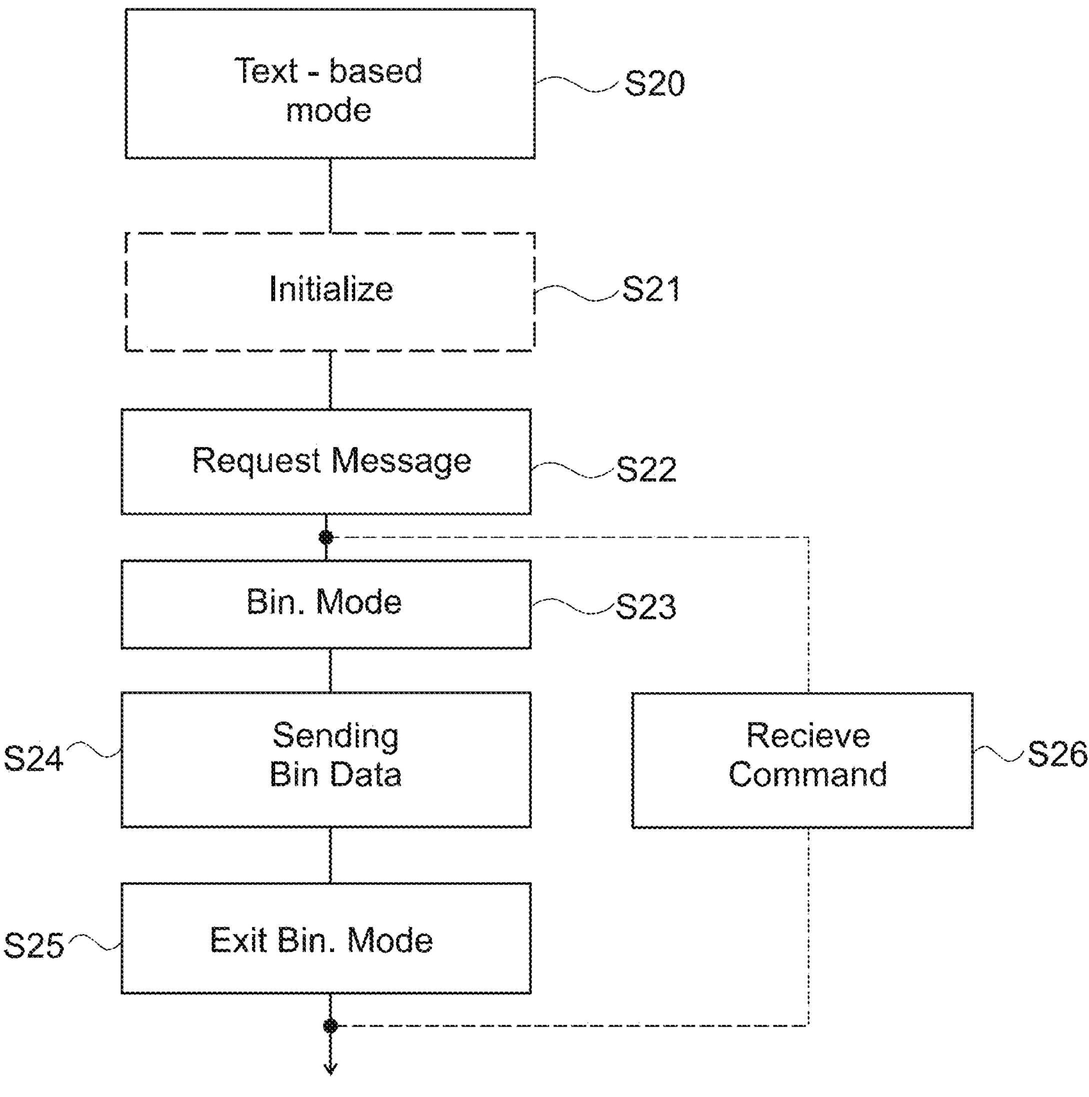
FIG. 2 shows an embodiment example of a method for receiving data via a serial, asynchronous interface as proposed.

FIG. 2 shows an exemplary embodiment of a method for receiving data via a serial, asynchronous interface as proposed. The method comprises the following steps:

S20: operating a device in a text-based sending protocol mode,

S22: sending, by the device, while operating in the text-based sending protocol mode, via the interface, a request message comprising a binary header component and a length indication, S23: Entering, by the device, into a binary sending protocol mode, S24: Sending, by the device, while operating in the binary sending protocol mode, an amount of binary data, the amount being specified by the length indication of the request message, and S25: Exiting, by the device, the binary sending protocol mode.

In this embodiment the device is sending data via the interface to a counterpart, for instance a host, which receives the data. For this, the device switches between the text-based and the binary sending protocol mode. The switchover is improved by introducing the request message having a binary header component with a predefined character and a length indication. Said request message achieves a synchronization between the device and its counterpart. The transfer of binary data can therefore be started right after sending the request message. Wait states for synchronization between device and its counterpart are eliminated and throughput over the interface is increased.

Optionally, the method also comprises step S21: Initializing the operation in the binary sending protocol mode. This step may be realized in two alternative ways.

According to a first alternative step S21 may comprise: receiving, by the device, at least one command message comprising a header component, a command component and a first length indication, and sending, by the device, a confirmation message confirming receipt of the command message and comprising a second length indication.

According to the first alternative, the initializing of the operation in the binary sending protocol mode is prompted by the communication partner of the device, so that the device receives the command message indicating that the communication partner is ready to receive data according to an amount which is defined in the first length indication. The device responds with the confirmation message and informs about the amount of data which is available for sending with the second length indication.

According to a second alternative, the device itself initializes the operation in the binary sending protocol mode by sending a trigger message comprising an indication of an amount of available binary data.

Optionally, the method may further comprise step S26: receiving, by the device, another command message comprising a header component, a command component and another length indication. This step is performed while sending the amount of binary data by the device in step S24. The device continues with sending, in the binary sending protocol mode, binary data according to another length indication of another command message.

By separating the actual data transmission from the command, the device is enabled to receive a new command message while currently transmitting last data in binary mode. This improves throughput compared to state of the art implementations, in which a host, once a command was issued, has to wait for a command status, i.e., OK or ERROR, before another command can be issued. Since in the proposed method the device sends the confirmation message before sending the data in binary mode, the host is allowed to kind of issue and have executed two commands concurrently and still obey to the rule requiring to wait for status before the next command.

Figure 3:
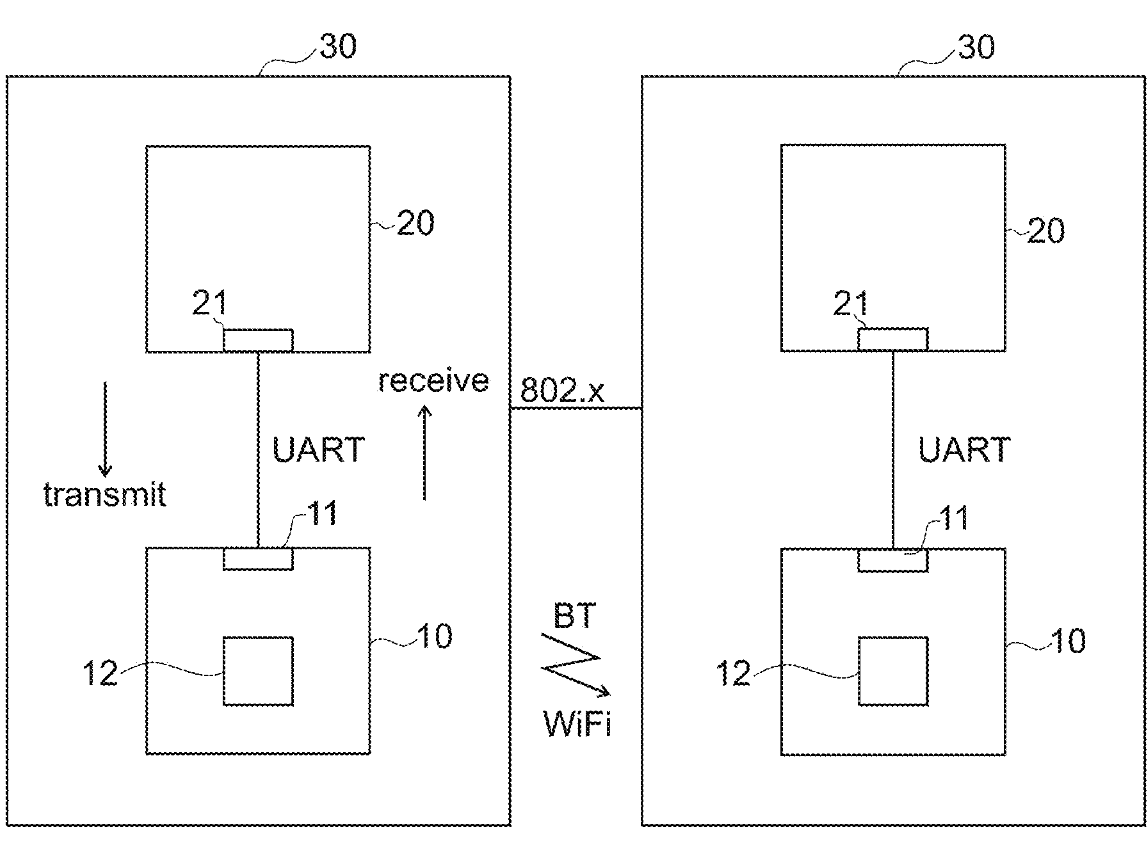
FIG. 3 shows an embodiment example of a device and a system as proposed.

FIG. 3 shows exemplary embodiments of a device and a system as proposed.

The device 10 comprises means configured to perform the method for transmitting data via a serial, asynchronous interface as described above, for example with reference to FIG. 1. Alternatively, or additionally, the device 10 comprises means configured to perform the method for receiving data via the serial, asynchronous interface as described above, for instance with reference to FIG. 2. The device 10 further comprises the serial, asynchronous interface 11. Said means may be implemented by a microcontroller, which is configured to run the methods realized in software or firmware.

The device 10 may be realized as an integrated module, for example on a single chip.

The device 10 may further comprise hardware and software components 12, which realize communication functionality as described above. Said communication functionality can be controlled and accessed from outside the device via the interface 11.

A system 30 as specified herein comprises the device 10 and a host apparatus 20. The host apparatus 20 also comprises a serial, asynchronous interface 21 which is coupled to the interface 11 of the device 10. The interface itself may be realized as a UART. The host apparatus 20 is configured for communication using the device 10 via the serial, asynchronous interface 21.

The host apparatus 20 realizes the communication counterpart or partner of the device 10 in exchanging, i.e. transmitting and receiving, data over the interface. In an exchange of data, the host apparatus 20 and the device 10 take over corresponding roles. In detail, in the case that the host apparatus 20 has data to be sent out from system 30 to another system, which may be another system 30 as proposed or may be an internet server or a mobile phone, the device 10 internally assumes the role of a receiving part and implements the method for transmitting data via the interface, as described above in FIG. 1. The host apparatus 20 assumes the role of a sender implementing the method for receiving data via the interface as described above, for instance with reference to FIG. 2.

In the opposite case, i.e. when data arrives from another system, for example another system 30 or an internet server or mobile phone, and is received via the components 12 for realizing the communication functionality of the device 10, the device 10 internally assumes the role of a sender and implements the method for receiving data via the interface as described in FIG. 2. The host apparatus 20 consequently assumes the role of a receiver and implements the method for transmitting data via the interface as described above in FIG. 1.

Figure 4:
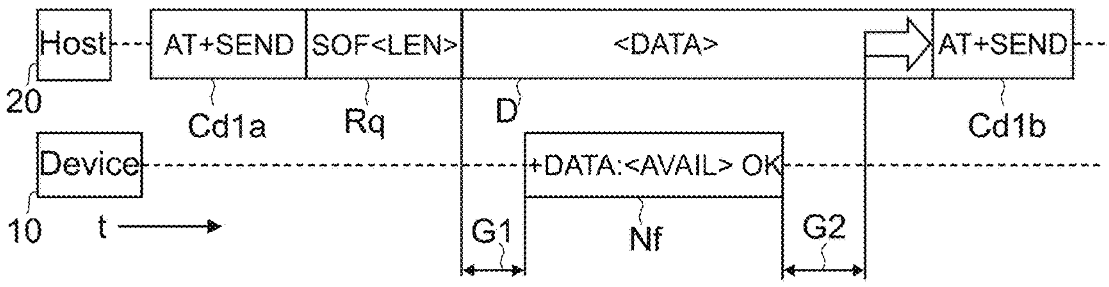
FIG. 4 shows an exemplary message flow of a method for transmitting data via a serial, asynchronous interface as proposed.

FIG. 4 shows an exemplary message flow according to an embodiment of the method for transmitting data via the serial, asynchronous interface as proposed. Messages are depicted in relation to time t as they are sent in this example from a host apparatus 20 to a device 10 or the other way round. The message flow is based on an exemplary implementation using the AT command set.

At the beginning, the device 10 is in the text-based receiving protocol mode as of step S10 of FIG. 1. Operation in the binary receiving protocol mode is initialized in the device by receiving a command message Cd1*a*. In the exemplary implementation using the AT command set, this command message Cd1*a* comprises a header, AT, followed by a command component which is the name of the command, here the string SEND. This corresponds to step S11 of FIG. 1.

Next, device 10 receives a request message Rq, which comprises a binary header component, here called SOF, and a length indication marked with LEN. This corresponds to step S12. By means of this request message Rq, the module or device 10 and the host apparatus 20 are synchronized for the subsequent transmission of data. Consequently, immediately after sending the request message Rq, the host apparatus 20 can start sending binary data D. The device 10 switches over to the binary receiving protocol mode upon receipt of the request message Rq as of step S13 of FIG. 1. The request message Rq is received by the device 10 after a gap G1, which corresponds to the time it takes for the device 10 to detect that the last byte of the request message Rq has been received. This time may also be referred to as the device receiving latency.

While receiving the amount of binary data D according to step S14 of FIG. 1, the device 10 may send a notification message Nf as of step S16 of FIG. 1. The notification message Nf comprises a notification component, here +DATA:<AVAIL>, to inform the host apparatus 20 about a maximum amount of data, which the device 10 is able to receive. Said notification message Nf may also comprise a confirmation information, here OK, confirming successful receipt of the command message Cd1*a* and the request message Rq. The notification message Nf is received by the host apparatus 20 after another gap G2, which amounts to the time it takes for the host apparatus 20 to detect that the last byte of the notification message Nf has been received. Time gap G2 is also referred to as the host apparatus receiving latency. The host may then schedule another chunk of data before the first chunk is completely transmitted and directly transmits this next chunk of data, because the host apparatus 20 knows from the notification message Nf how much data can be received by the device 10.

After having received the first and, optionally, the second chunk of binary data, the device switches over to the text-based receiving protocol mode according to step S16 of FIG. 1 and receives another command message Cd1*b*, which announces subsequent sending of another request message from the host apparatus 20 (not shown).

It can be seen from the message flow that, besides inevitable gaps G1 and G2 which result from receiving latencies of device 10 and host apparatus 20, respectively, no additional wait states are required.

In an exemplary scenario, the request message Rq may have a length indication with zero length. This causes the device 10 to transmit a notification message Nf informing about the maximum amount of data which may be received by the device. Subsequently, the host apparatus 20 may directly transmit the amount of data D according to that indicated maximum amount.

Figure 5:
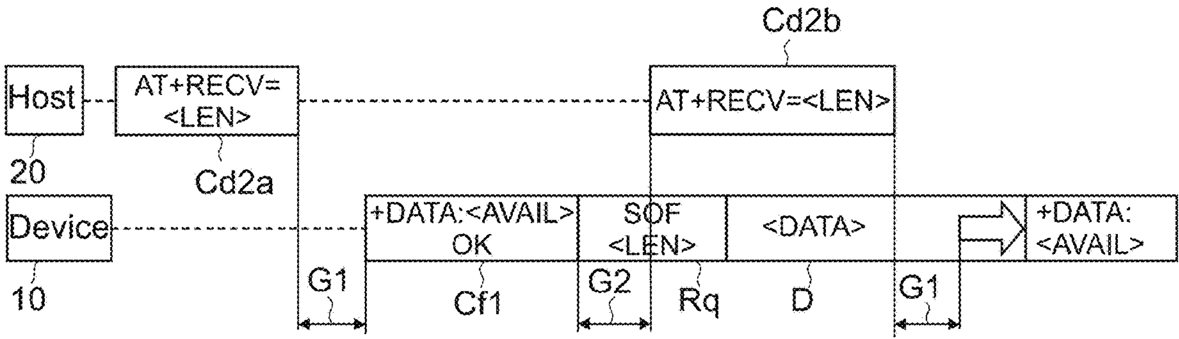
FIG. 5 shows an exemplary message flow of a method for receiving data via a serial, asynchronous interface as proposed.

FIG. 5 shows an exemplary message flow for the method for receiving data via the serial, asynchronous interface as proposed. Also in this example, the AT command set is used for exchange of data over a UART interface, as an example of a serial, asynchronous interface. The different messages are shown in relation to time t and are depicted from the sending perspective.

First, the device 10 is in the text-based sending protocol mode as of step S20 of FIG. 2. The host apparatus 20 sends a command message Cd2*a* comprising a header component, here AT, a command component, here the string RECV, and a length indication, here marked as LEN. This command message Cd2*a* indicates the host apparatus's 20 willingness to receive data.

For further initializing the operation in the binary sending protocol mode of the device 10 according to step S21 of FIG. 2, the device, after receipt of the command message Cd2*a* after the first gap G1, sends a confirmation message Cf1. Said confirmation message Cf1 confirms receipt of the command message Cd2*a*, here with OK, and transmits a second length indication, here +DATA:<AVAIL>, informing the host apparatus 20 about the amount of data that is available to be transferred from the device 10 to the host apparatus 20. Directly after sending said confirmation message Cf1, the device 10 sends the request message Rq comprising the binary header component and the length indication, according to step S22 of FIG. 2. Subsequently, device 10 enters into the binary sending protocol mode as of Step S23 of FIG. 2.

Next, the device 10 transmits the amount of binary data D according to step S24 of FIG. 2. While sending the amount of data D, the device 10 may receive another command message Cd2*b* from the host apparatus 20 according to step S26 of FIG. 2. The command message Cd2*b* corresponds to the command message Cd2*a*, but may have another value in the length indication. In this case, the device 10 may directly continue transmitting binary data D according to the length indicated in the command message Cd2*b*.

Also here it can be determined that, besides the inevitable gaps G1 and G2, no further wait states are necessary for keeping device 10 and host apparatus 20 in sync and transmitting binary data.

Figure 6:
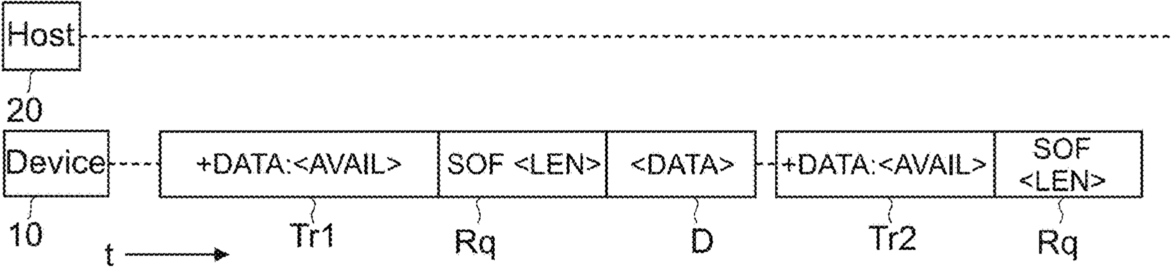
FIG. 6 shows another exemplary message flow of a method for receiving data via a serial, asynchronous interface as proposed.

FIG. 6 shows another exemplary message flow for the method for receiving data via the serial, asynchronous interface as proposed. Messages transmitted by the module 10 are shown in relation to time t. In this example, an alternative way of initializing the operating in the binary sending protocol mode for the device 10 is shown.

For this, the device 10 sends a trigger message Tr1. According to the AT command set, a so-called unsolicited result code, URC, is used for this trigger message Tr1. Said URC may be spontaneously sent any time. The URC comprises an event name, here DATA, signifying that data shall be transmitted. Furthermore, with the trigger message Tr1, an amount of available binary data is indicated, here by AVAIL. Right after sending the trigger message Tr1, the device 10 sends the request message Rq and subsequently enters the binary sending protocol mode. The device 10 immediately starts transmitting the amount of binary data D.

After finishing sending the amount of binary data D, the device 10 enters into the text-based sending protocol mode.

Later on, the device 10 may send a further trigger message Tr2 in the text-based sending protocol mode announcing the subsequent transmission of another chunk of binary data to the host apparatus 20.

For this alternative it is assumed that the device can reuse flow control mechanisms implemented in hardware as known by the skilled person in order to prevent potential memory overflow.

It will be appreciated that the invention is not limited to the disclosed embodiments and to what has been particularly shown and described hereinabove. Rather, features recited in separate dependent claims or in the description may advantageously be combined. Furthermore, the scope of the invention includes those variations and modifications which will be apparent to those skilled in the art and fall within the scope of the appended claims. Exemplary names used for command component, notification component, confirmation information and the like shall not be regarded as limiting the scope of the invention. The term "comprising" used in the claims or in the description does not exclude other elements or steps of a corresponding feature or procedure. In the case that the terms "a" or "an" are used in conjunction with features, they do not exclude a plurality of such features. Moreover, any reference signs in the claims should not be construed as limiting the scope.

REFERENCE SIGNS

10 device
20 host apparatus
30 system
11, 21 interface
12 communication functionality
S10, S11, S12, S13, S14, S15, S16 step
S20, S21, S22, S23, S24, S25, S26 step
Rq, Nf, Cd1*a*, Cd1*b*, Cd2*a*, Cd2*b* message
CF1, Cf2, Tr1, Tr2 message
D data
G1, G2 gap

The invention claimed is:

1. A method for transmitting data via a serial, asynchronous interface, the method comprising:

operating a device in a text-based receiving protocol mode, receiving, by the device while operating in the text-based receiving protocol mode, via the interface, a request message comprising a binary header component and a length indication, automatically entering, by the device, into a binary receiving protocol mode upon receipt of the request message, receiving, by the device while operating in the binary receiving protocol mode, an amount of binary data, the amount being specified by the length indication of the request message, determining, from the length indication, when to exit the binary receiving protocol mode, and exiting, by the device, the binary receiving protocol mode when the amount of data specified by the length indication has been received.

2. The method according to claim 1, wherein operating the device in the text-based receiving protocol mode comprises initializing operation in the binary receiving protocol mode.

3. The method according to claim 2, wherein initializing operation in the binary receiving protocol mode comprises receiving, by the device, at least one command message comprising a header and a command component, and wherein the at least one command message complies with the AT command set.

4. The method according to claim 3, further comprising sending, by the device, while receiving the amount of binary data, a notification message comprising a notification component defining a maximum amount of data which the device is able to receive, and receiving, by the device, another amount of binary data while operating in the binary receiving protocol mode, this other amount of binary data being specified by the notification component of the notification message.

5. The method according to claim 4, wherein the notification message additionally comprises a confirmation information confirming successful receipt of the at least one command message and the request message.

6. The method according to claim 4, further comprising directly after the receiving, by the device while operating in the binary receiving protocol mode, the another amount of binary data, entering, by the device, into the text-based receiving protocol mode, and receiving, by the device while operating in the text-based receiving protocol mode, another command message comprising a header component and a command component.

7. The method according to claim 1, wherein the binary header component of the request message comprises a pre-defined character.

8. A method for receiving data via a serial, asynchronous interface, the method comprising:

operating a device in a text-based sending protocol mode, sending, by the device while operating in the text-based sending protocol mode, via the interface, a request message comprising a binary header component and a length indication, entering, by the device, into a binary sending protocol mode, immediately sending, without a wait state following sending the request message and by the device, while operating in the binary sending protocol mode, an amount of binary data, the amount being specified by the length indication of the request message, exiting, by the device, the binary sending protocol mode.

9. The method according to claim 8, wherein operating the device in the text-based sending protocol mode comprises initializing operation in the binary sending protocol mode.

10. The method according to claim 9, wherein initializing operation in the binary sending protocol mode comprises receiving, by the device, at least one command message comprising a header component, a command component and a first length indication, wherein the at least one command message complies with the AT command set, and the command component triggers the subsequent sending of the request message, and sending, by the device, a confirmation message confirming receipt of the at least one command message and comprising a second length indication.

11. The method according to claim 10, further comprising while sending the amount of binary data by the device, receiving, by the device, another command message comprising a header component, a command component and another length indication, continuing with sending, by the device in the binary sending protocol mode binary data according to the another length indication of the another command message.

12. The method according to claim 9, wherein initializing operation in the binary sending protocol mode comprises sending, by the device, a trigger message comprising an indication of an amount of available binary data.

13. A device comprising:

a serial, asynchronous interface;

a microcontroller and memory comprising instructions that, when executed by the microcontroller, cause the microcontroller to perform a method comprising operating the device in a text-based receiving protocol mode, receiving, by the device while operating in the text-based receiving protocol mode, via the serial, asynchronous interface, a request message comprising a binary header component and a length indication, automatically entering, by the device, into a binary receiving protocol mode upon receipt of the request message, receiving, by the device while operating in the binary receiving protocol mode, an amount of binary data, the amount being specified by the length indication of the request message, determining, from the length indication, when to exit the binary receiving protocol mode, and exiting, by the device, the binary receiving protocol mode when the amount of data specified by the length indication has been received.

14. The device according to claim 13, wherein the device is implemented as an integrated module further comprising hardware and software components for realizing a communication functionality, and wherein the communication functionality is configured for control via the serial, asynchronous interface.

15. A system comprising:

a device according to claim 13; and a host apparatus comprising a serial, asynchronous interface, which is coupled to the serial, asynchronous interface of the device, wherein the host apparatus is configured for communication using the device via the serial, asynchronous interface.

16. A device comprising:

a serial, asynchronous interface;

a microcontroller and memory comprising instructions that, when executed by the microcontroller, cause the microcontroller to perform a method comprising operating the device in a text-based sending protocol mode, sending, by the device while operating in the text-based sending protocol mode, via the interface, a request message comprising a binary header component and a length indication, entering, by the device, into a binary sending protocol mode, immediately sending, without a wait state following sending the request message and by the device, while operating in the binary sending protocol mode, an amount of binary data, the amount being specified by the length indication of the request message, and exiting, by the device, the binary sending protocol mode.

17. The device according to claim 16, wherein the device is implemented as an integrated module further comprising hardware and software components for realizing a communication functionality, and wherein the communication functionality is configured for control via the serial, asynchronous interface.

18. A system comprising:

a device according to claim 16; and a host apparatus comprising a serial, asynchronous interface, which is coupled to the serial, asynchronous interface of the device, wherein the host apparatus is configured for communication using the device via the serial, asynchronous interface.

* * * * *